US012415451B2

(12) United States Patent
Jeon et al.

(10) Patent No.: US 12,415,451 B2
(45) Date of Patent: Sep. 16, 2025

(54) MULTIFUNCTIONAL PORTABLE ARTICLE HOLDER AND VEHICLES HAVING SAME

(71) Applicants: Hyundai Motor Company, Seoul (KR); Kia Corporation, Seoul (KR)

(72) Inventors: Jeong-Kyun Jeon, Gyeonggi-do (KR); Hyung-Jae Im, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 308 days.

(21) Appl. No.: 17/840,119

(22) Filed: Jun. 14, 2022

(65) Prior Publication Data
US 2023/0107332 A1   Apr. 6, 2023

(30) Foreign Application Priority Data

Oct. 5, 2021   (KR) .................. 10-2021-0131547

(51) Int. Cl.
*B60N 3/10* (2006.01)
*B60R 11/02* (2006.01)
*B60R 11/00* (2006.01)

(52) U.S. Cl.
CPC .......... *B60N 3/102* (2013.01); *B60R 11/0241* (2013.01); *B60R 2011/0015* (2013.01)

(58) Field of Classification Search
CPC .......... B60N 3/10; B60N 3/102; B60N 3/105; B60N 3/107; B60N 3/108; B60N 3/101; B60R 11/0235; B60R 11/0241; B60R 11/0252; B60R 2011/0012; B60R 2011/0015
See application file for complete search history.

(56) References Cited

U.S. PATENT DOCUMENTS

| | | | | |
|---|---|---|---|---|
| 7,036,784 B2 * | 5/2006 | Peitzmeier | ............. | B60N 3/102 248/311.2 |
| 9,511,862 B2 * | 12/2016 | Thiele | ............... | B64D 11/00152 |
| 9,776,722 B2 * | 10/2017 | Pozzi | ................ | B64D 11/00152 |
| 10,029,793 B2 * | 7/2018 | Pozzi | ................. | B64D 11/0605 |
| 10,086,771 B2 | 10/2018 | Barre et al. | | |
| 10,128,671 B2 * | 11/2018 | Yu | ....................... | A47G 23/0225 |
| 10,637,980 B1 | 4/2020 | Nawas | | |

(Continued)

FOREIGN PATENT DOCUMENTS

| | | |
|---|---|---|
| CN | 205395873 U | 7/2016 |
| CN | 206820799 U | 12/2017 |

(Continued)

*Primary Examiner* — Jonathan Liu
*Assistant Examiner* — Guang H Guan
(74) *Attorney, Agent, or Firm* — Fox Rothschild LLP

(57) ABSTRACT

In one aspect, a multifunctional portable article holder is provided. The holder comprises a cup holder section configured to hold a portable container, a moving holder section configured to affix a mobile device placed on and held by the cup holder section, a holder plate coupling the cup holder section and the moving holder section, and a multifunctional member composed of one or more of a folding mechanism configured to fold or unfold the cup holder section with respect to the holder plate, a tilt mechanism configured to position the mobile device on the cup holder section at different watching angles, and a sliding mechanism configured to move the moving holder section within a height-adjustable distance.

17 Claims, 12 Drawing Sheets

(56) References Cited

U.S. PATENT DOCUMENTS

| | | | |
|---|---|---|---|
| 11,912,189 B2* | 2/2024 | Kim .................. | H02J 50/10 |
| 2014/0263931 A1 | 9/2014 | Chen | |
| 2023/0107332 A1* | 4/2023 | Jeon .................. | B60R 11/02 |
| | | | 248/311.2 |

FOREIGN PATENT DOCUMENTS

| | | | | |
|---|---|---|---|---|
| CN | 109318773 A | | 2/2019 | |
| KR | 102045078 B1 | | 11/2019 | |
| KR | 102113123 B1 * | | 5/2020 | ............. B60N 3/102 |

* cited by examiner

<PARTIAL ENLARGEMENT>

<SECTION A-A>

FIG.9
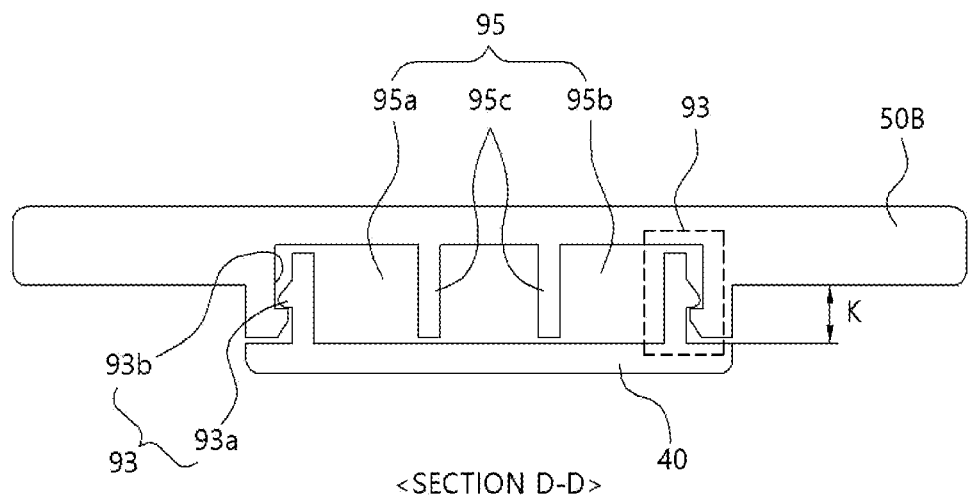
<SECTION D-D>
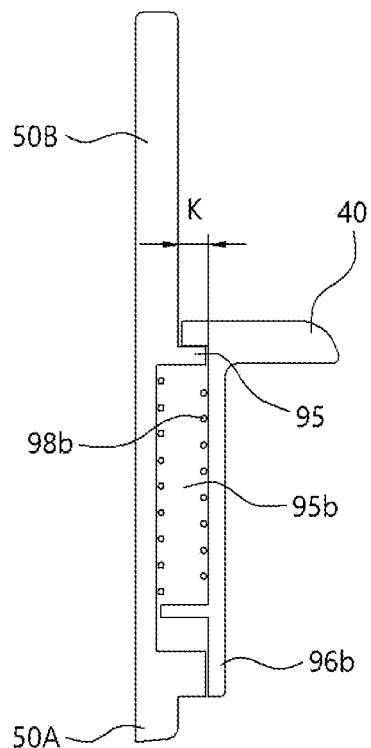
<SECTION E-E>

<SECTION F-F>

MULTIFUNCTIONAL PORTABLE ARTICLE HOLDER AND VEHICLES HAVING SAME

CROSS-REFERENCE TO RELATED APPLICATION

This application claims under 35 U.S.C. § 119(a) the benefit of Korean Patent Application No. 10-2021-0131547, filed on Oct. 5, 2021, the entire contents of which are incorporated herein by reference.

BACKGROUND OF THE DISCLOSURE

Field of the Disclosure

The present disclosure relates to a portable article holder, and more particularly, to a vehicle having a multifunctional portable article holder that can hold a container such as a cup, as well as mobile devices.

Background

In general, the interior of a vehicle is provided with a cup holder near a center fascia of a dashboard or on a back side of a seat back of a seat (i.e., a seat chair).

As an example, the seat back cup holder among the cup holders is composed of a pair of an annular ring-shaped cup guide and a plate-shaped cup support hinged on the back side of the seat back such that in an unused state in which the cup holder is vertically folded in close contact with the back side of the seat back, when in use, the cup guide and the cup support are unfolded horizontally by holding the cup guide or the cup support and lowering the same.

Therefore, the seat back cup holder fixedly holds a cup placed through the cup guide unfolded horizontally with respect to the back side of the seat back while supporting the cup with the cup support.

In particular, the seat back cup holder has advantages that the overall volume is small, structural simplicity due to a folding structure (that is, a foldable structure) is provided, and there is no space restrictions or inconvenience when a passenger moves for boarding/alighting in a narrow space between seats of a bus.

As described above, the seat back cup holder is installed on the back side of a seat back of each passenger seat in a bus, which is a public transportation means, so that a passenger can mount or fix portable containers, such as cups, cans, and PET bottles, on or to the seat back cup holder with convenience.

However, since such a seat back cup holder only provides a cup holding function by the cup guide due to its structural simplicity, the seat back cup holder is not suitable for affixing or mounting various portable articles, and in particular, it has structural limitations in that it cannot hold a mobile device that is modern people's necessities.

Moreover, due to the nature of using mobile phones everywhere in the age of one-person one-mobile phone, when passengers traveling by bus (e.g., a seated city bus) try to watch a movie on a mobile phone in their seat, the passengers have no choice, but to suffer from the inconvenience of having to hold their phones with their hand for watching even if their arm hurts because they cannot use such a seat back cup holder.

SUMMARY OF THE DISCLOSURE

In one aspect, a multifunctional portable article holder is provided in which an unfolded cup holder is converted into a mobile device holder, thereby affixing and holding various portable articles with different shapes, such as cups and smartphones while maintaining an advantageous foldable feature of a cup holder capable of reducing the overall volume, and in particular, adjusting a passenger's screen-watching angle in multiple stages with a tilt-type structure, while easily holding mobile devices having different sizes with a foldable structure-associated sliding-type structure, and a vehicle having the same.

In order to accomplish the above objective, according to an aspect of the present disclosure, a multifunctional portable article holder comprises: a cup holder section configured to hold a portable container; a moving holder section configured to affix a mobile device placed on and held by the cup holder section; a holder plate coupling the cup holder section and the moving holder section; and a multifunctional member composed of one or more of a folding mechanism configured to fold or unfold the cup holder section with respect to the holder plate, a tilt mechanism configured to position the mobile device on the cup holder section at different watching angles, and a sliding mechanism configured to move the moving holder section within a height-adjustable distance.

In a preferred exemplary embodiment, the cup holder section is configured as a lower folding section of the holder plate, and the moving holder section is configured as an upper sliding section of the holder plate.

In a preferred exemplary embodiment, the cup holder section comprises: a cup holder guide configured to support a body portion of the portable container; a cup support base configured to support the bottom surface of the portable container, and a link rod configured to fixedly connect the cup holder guide and the cup support base with a gap interposed therebetween to allow the cup holder guide and the cup support base to be folded or unfolded at the same time.

In a preferred exemplary embodiment, the cup holder guide and the cup support base are capable of switching between a folded state having a vertical (0°) position and an unfolded state having a horizontal (90°) position.

In a preferred exemplary embodiment, the moving holder section holds the mobile device using an upper holding part of a "T"-shaped structure.

In a preferred exemplary embodiment, the folding mechanism is formed on the holder plate as the center of rotation of the cup holder section.

In a preferred exemplary embodiment, the folding mechanism comprises: a hinge partition wall protruding from the holder plate to define a cup holder section space in which the cup holder section is positioned; a hinge shaft supported by the hinge partition wall as the center of rotation for a hinge rotary part of the cup holder section to fold or unfold the cup holder section; and a stopper protruding from the holder plate so as to be in contact with the cup holder section so that an unfolded state of the cup holder section is constrained.

In a preferred exemplary embodiment, the stopper consists of a front stopper and a rear stopper protruding from the cup holder section space, wherein the front stopper supports the hinge rotary part to prevent downward movement of the cup holder section in the unfolded state of the cup holder section, and the rear stopper presses the hinge rotary part to prevent upward movement of the cup holder section in the unfolded state of the cup holder section.

In a preferred exemplary embodiment, the front stopper has a bar-shaped linear protrusion structure, and the rear stopper has an arc-shaped curved protrusion structure in which a plurality of curved protrusions is spaced a predetermined distance from each other.

In a preferred exemplary embodiment, the tilt mechanism is formed in the cup holder section to serve as a mobile device holder on which the mobile device is placed.

In a preferred exemplary embodiment, the tilt mechanism comprises: a first-stage protrusion forming a front section, in which the mobile device is placed, on the mobile device holder; and a second-stage groove forming a rear section, in which the mobile device is placed, on the mobile device holder, wherein the first-stage protrusion and the second-stage groove are provided adjacent to each other to form a continuous structure.

In a preferred exemplary embodiment, the sliding mechanism is formed by a combination of the moving holder section and the holder plate to provide the height-adjustable distance as an upper/lower stroke of the moving holder section.

In a preferred exemplary embodiment, the sliding mechanism comprises: a lifting guide forming a movement path of the moving holder section in the holder plate; and a lowering guide providing a compressive force accumulated in an upper stroke process as a restoring force for returning the moving holder section to its initial position in a lower stroke process.

In a preferred exemplary embodiment, the lifting guide comprises: a sliding rail formed in a protrusion structure on the moving holder section; a sliding slot recessed in a slot structure in the holder plate; and a hook coupled in a concave-convex (凹凸) fitting structure between a side surface of the sliding rail and an inner wall of a casing of the lowering guide to prevent the upward movement of the sliding rail.

In a preferred exemplary embodiment, the fitting structure of the hook is composed of a convex (凸) positioner protruding from the side surfaced of the sliding rail and a concave-shaped (凹) positioning groove recessed in the inner wall of the casing.

In a preferred exemplary embodiment, the lowering guide comprises: a casing formed in a quadrangular frame structure on the holder plate and covered by the moving holder section; a base portion formed in a protrusion structure on the moving holder section and positioned in an inner space of a quadrangular frame of the casing; and a compressive spring elastically supported by the base portion to generate the compressive force and the restoring force.

In a preferred exemplary embodiment, the compressive spring is disposed in a double arrangement in which a left compressive spring is provided in a left chamber of the quadrangular frame inner space of the casing, and a right compressive spring is provided in a right chamber of the quadrangular frame inner space of the casing, the left and right chamber being formed by dividing the quadrangular frame inner space with a partition wall of the casing.

In a preferred exemplary embodiment, the holder plate is mounted on a seat back of a seat via a mounting plate so that the cup holder section and the moving holder section are manipulated from the rear side of the seat back.

According to another aspect of the present disclosure, a vehicle comprises: a multifunctional portable article holder including a multifunctional member composed of one or more of a folding mechanism configured to fold or unfold a cup holder section, in which a portable container is fixedly held, with respect to the holder plate, a tilt mechanism configured to position a mobile device held on the cup holder section at different watching angles, and a sliding mechanism configured to move the moving holder section within a height-adjustable distance; and a seat on which the multifunctional portable article holder is mounted.

In a preferred exemplary embodiment, the multifunctional portable article holder is disposed on a seat back forming the back of the seat, and the seat back is coupled with the holder plate by means of a mounting plate mounted on a rear side of the seat back.

The multifunctional portable article holder applied to a vehicle according to the present disclosure provides the following operations and effects.

First, the structural combination of the folding mechanism and the sliding mechanism allows the existing cup holder to expand its use from a single purpose to multipurpose. Second, since the portable article holder may be used for multipurpose, it is possible to hold and fix smartphones and mobile devices of various shapes other than the cup shape. Third, in terms of improvement in marketability, the portable article holder provides a holding function for smartphones and mobile devices in addition to the cup holding function, thereby providing convenience to bus passengers by preventing bus passengers' inconvenience that the passengers need to watch a smartphone while holding it by hand. Fourth, using the height adjustable structure of the sliding mechanism, passengers may use mobiles without anxiety about damage due to detachment of mobile devices, especially smartphones. Fifth, since the angle of the mounted smartphone is adjusted in at least two stages by the tilt mechanism using the cup guide, it is possible to adjust the passenger' screen-watching angle, together with free adjustment for the width and height according to the width dimension of a device. Sixth, the portable article holder serves as the seat back cup holder in which the foldable function of folding/unfolding, the height adjustable sliding function, and the holding angle-adjustable tilting function are associated with a simple connection structure, thereby improving user convenience and product performance.

In another aspect, a vehicle is provided that comprises one or more a multifunctional portable article holder as disclosed herein.

Other aspects are disclosed infra.

BRIEF DESCRIPTION OF THE DRAWINGS

FIG. 9 is a partial cross-sectional view illustrating the sliding mechanism according to the present disclosure.

DETAILED DESCRIPTION

Figure 1:
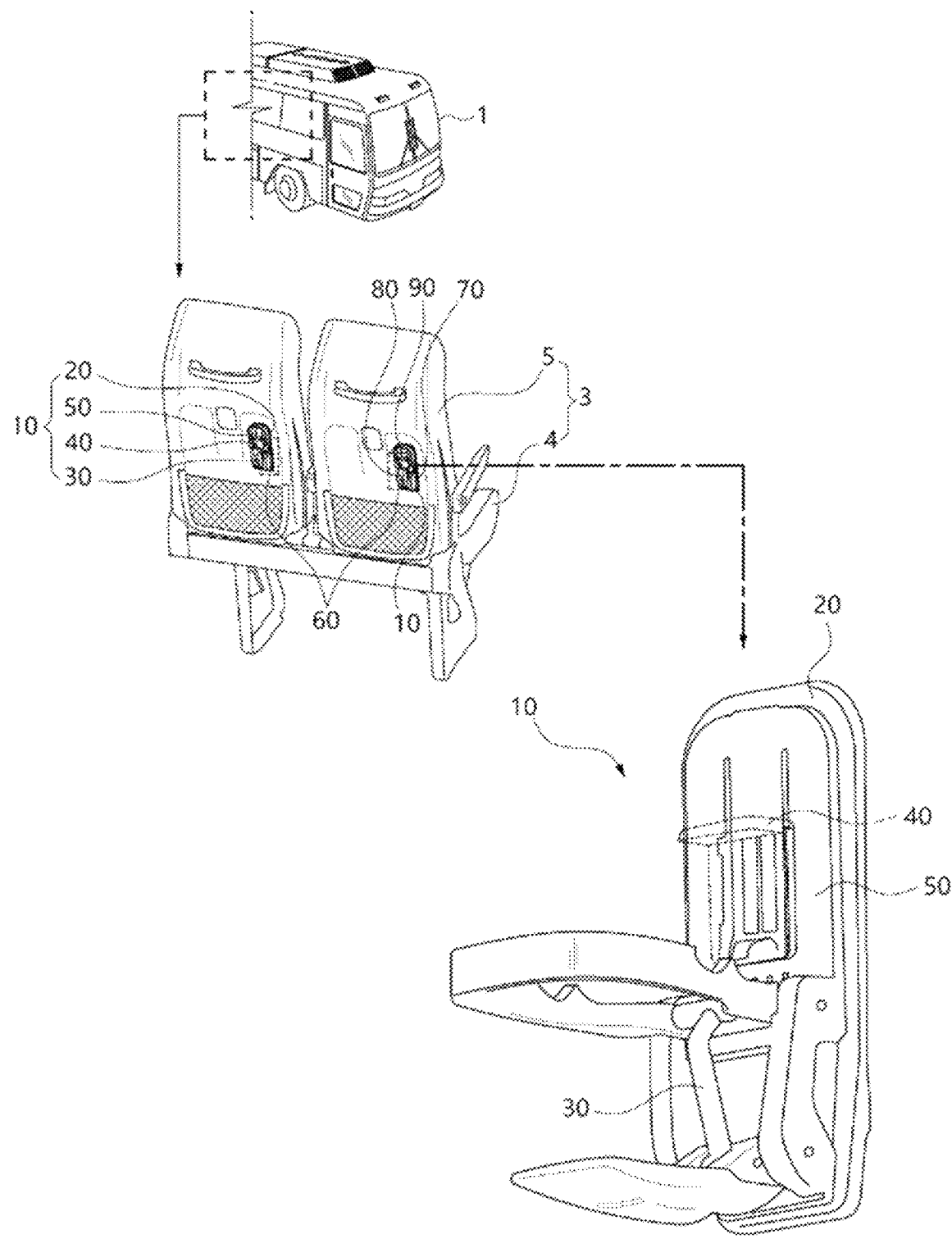
FIG. 1 is a configuration diagram illustrating a multifunctional portable article holder applied to a passenger seat of a vehicle according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some exemplary embodiments of the present disclosure will be described in detail with reference to the accompanying exemplary drawings. Such embodiments are illustrative and may be implemented in various different forms by those of ordinary skill in the art to which the present disclosure pertains, so it is not limited to the embodiments disclosed herein. In the drawings, the same reference numerals will be used throughout to designate the same or equivalent elements. In addition, a detailed description of well-known features or functions will be ruled out in order not to unnecessarily obscure the gist of the present disclosure.

Referring to FIG. 1, a vehicle 1 comprises a multifunctional portable article holder 10 applied to a seat 3.

In one aspect, the seat 3 is exemplified as a bus seat and is composed of a seat cushion 4 and a seat back 5 that is vertically erected on the seat cushion 4 to have a tilting function. Therefore, the vehicle 1 may comprise any of a passenger car, a leisure vehicle, a commercial vehicle, a bus, a train, or an airplane having passenger seats. However, hereinafter, the vehicle will be described as a bus that is a public transportation means.

Specifically, the multifunctional portable article holder 10 comprises a mounting plate 20, a cup holder section 30, a moving holder section 40, a holder plate 50, and a multifunctional member 60.

For example, the cup holder section 30 has a quadrangular ring structure capable of housing a portable container (e.g., a cup, a can, a PET bottle), the moving holder section 40 holds mobile devices 200 and 300 placed in the cup holder section 30. and the holder plate 50 combines the cup holder section 30 and the moving holder section 40.

For example, the multifunctional member 60 comprises a folding mechanism 70 for folding the cup holder section 30 into the holder plate 50, a tilt mechanism 80 for tilting a holding angle of the mobile devices 200 and 300, and a sliding mechanism 90 for adjusting a holding height of the mobile devices 200 and 300. In this case, the folding mechanism 70, the tilt mechanism 80, and the sliding mechanism 90 are illustrated in detail with reference to FIGS. 2 to 9.

In particular, the multifunctional portable article holder 10 is mounted on each of seat backs 5 of seats 3 arranged in parallel in a pair.

Figure 2:
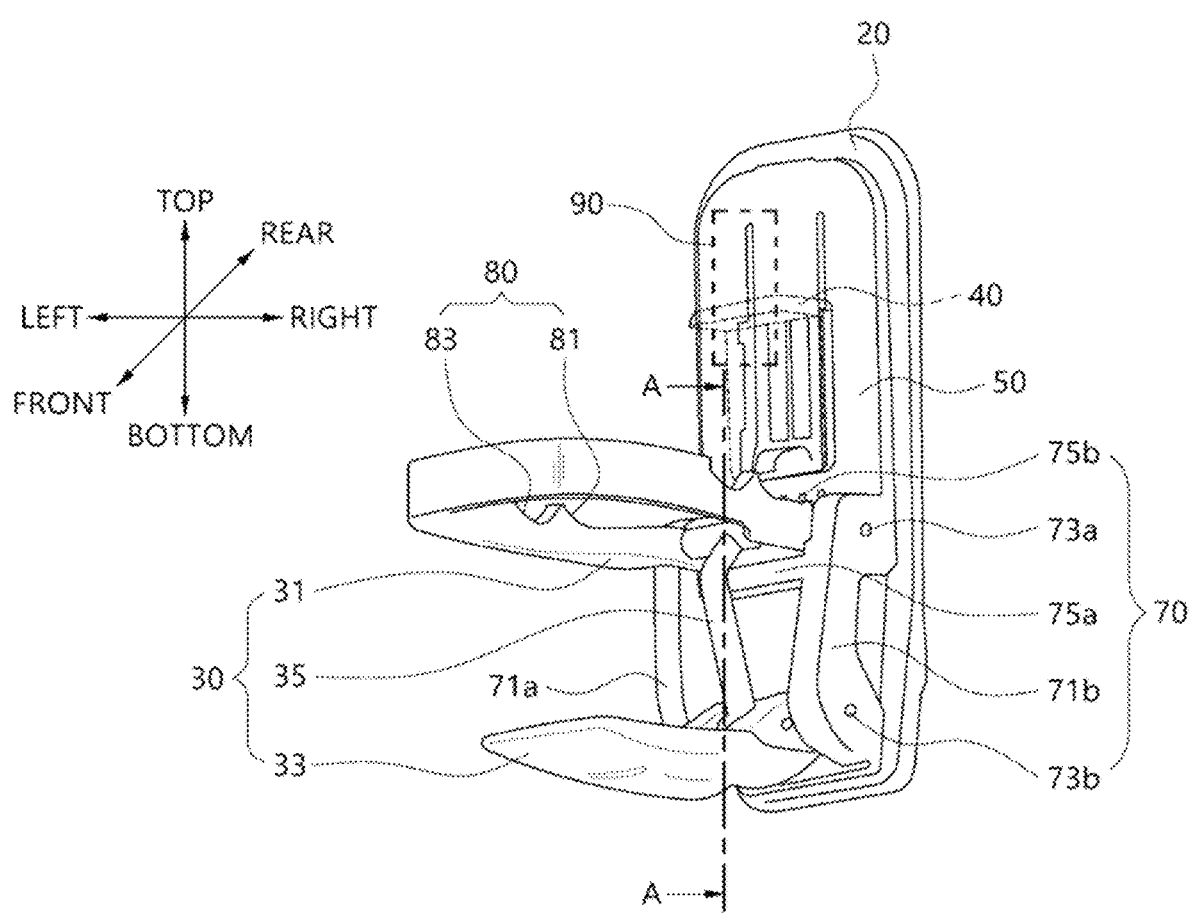
FIGS. 2 and 3 are perspective views illustrating a multifunctional portable article holder to which a folding mechanism, a tilt mechanism, and a sliding mechanism are applied according to the present disclosure.
Figure 3:
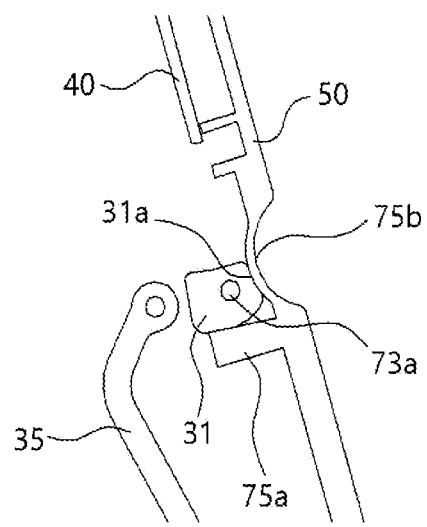

On the other hand, FIGS. 2 and 3 illustrate the detailed configuration of the multifunctional portable article holder 10.

Referring to FIG. 2, the multifunctional portable article holder 10 is composed of a mounting plate 20, a cup holder section 30, a moving holder section 40, a holder plate 50, and a multifunctional member 60.

For example, the mounting plate 20 has a rectangular plate shape, which is attached to the back side of a seat back 5 of a seat 3 at the back surface thereof, and the holder plate 50 is coupled to the front surface thereof. In this case, the mounting plate 20 is attached to the seat back 5 by screws or welding.

Specifically, the cup holder section 30 is composed of a cup holder guide 31, a cup support base 33, and a link rod 35. In this case, the cup holder guide 31 supports a body of a portable container (e.g., see a PET bottle 100 in FIG. 6), and the cup support base 33 supports the bottom of a portable container (e.g., see a PET bottle 100 in FIG. 6).

For example, the cup holder guide 31 has a quadrangular ring structure in which one end side thereof is coupled to the holder plate 50 by an upper hinge shaft 73a of the folding mechanism 70, thereby acting as an upper hinge rotary part to allow for a folding operation of the cup holder guide 31 being folded to the mounting plate 20, and an unfolding operation of the cup holder guide 31 being unfolded at 90 degrees from the mounting plate 20. In this case, the cup holder guide 31 may be formed in a circular ring structure instead of the quadrangular ring structure.

Referring to the cross section A-A of FIG. 3, the cup holder guide 31 is configured such that a concave contact surface 31a, with which a rear stopper 75b of the folding mechanism 70 comes into contact, is formed in an arc shape around the upper hinge rotary part, thereby restraining the upper hinge rotary part such that the unfolded (that is, 90° unfolded state) cup holder guide 31 does not switch back to the folded state.

Referring back to FIG. 2, for example, the cup support base 33 has a quadrangular plate shape in which one end side thereof is coupled to the holder plate 50 by a lower hinge shaft 73b of the folding mechanism 70, thereby acting as a lower hinge rotary part to allow for a folding operation of the cup support base 33 being folded to the holder plate 50, and an unfolding operation of the cup support base 33 being unfolded at 90 degrees from the holder plate 50. In this case, the cup holder guide 31 may be formed in a circular plate shape instead of the quadrangular plate shape.

For example, the link rod 35 is formed as a vertical connection rod having an "I"-shaped structure connecting an upper horizontal rod and a lower horizontal rod, wherein the upper horizontal rod is fixedly inserted into the upper hinge rotary part of the cup holder guide 31 and the lower horizontal rod is fixedly inserted into the lower hinge rotary part of the cup support base 33. In this case, the vertical connection rod has a length that is equal to the length of the cup support base 33 or a hinge partition wall 71 of the folding mechanism 70.

Therefore, the link rod 35 integrally binds the cup holder guide 31 and the cup support base 33 to allow the cup support base 33 to move together with the cup holder guide 31 during the folding and unfolding operations of the cup holder guide 31.

Accordingly, the cup holder 30 maintains rigidity using the link rod 35 in a 90° unfolded state (i.e., unfolded state) of the cup holder guide 31 and the cup support base 33, thereby ensuring that the cup support base 33 firmly supports the bottom of a cup or a portable container (e.g., refer to a PET bottle 100 of FIG. 6) placed in the cup holder guide 31.

For example, the moving holder section 40 is formed in a "T" shape, and is coupled to the holder plate 50 by a sliding mechanism 90 such that the moving holder section is movable up/down along the holder plate 50 from above the cup holder 30 (i.e., the cup holder guide 31). Therefore, when a mobile device 200 (see FIG. 7) is obliquely placed on the cup holder section 30 (i.e., the cup holder guide 31) by the tilt mechanism 80, the moving holder section 40 holds an upper side of the mobile device with an upper cover portion of the "T" shaped part (see FIG. 11), thereby maintaining the fixed state of the mobile device.

For example, the holder plate 50 has a rectangular plate shape, which is coupled to the mounting plate 20 on its back surface, and comprises the cup holder section 30 and the moving holder section 40 on its front surface. In this case, the holder plate 50 may be coupled to the mounting plate 20 by means of concave-convex fitting structure or fixed by screws or welding.

In particular, the holder plate 50 divides its entire length into a lower folding section 50A and an upper sliding section 50B (see FIG. 8), wherein the cup holder section 30 is placed in the folding section 50A and the moving holder section 40 is placed in the sliding section 50B.

Specifically, the multifunctional member 60 is formed with an interconnection structure of the cup holder section 30, the moving holder section 40, and the holder plate 50. The multifunctional member 60 is composed of a folding mechanism 70 to provide a 90° rotary structure for folding and unfolding of the cup holder section 30 (i.e., the cup holder guide 31 and the cup support base 33), a tilt mechanism 80 to provide a tilting mobile device-holding structure for the cup holder section 30 (i.e., the cup holder guide 31), and a sliding mechanism 90 to provide a height-adjustable mobile device-holding structure for the moving holder section 40.

To this end, the folding mechanism 70 is formed directly in the folding section 50A (see FIG. 8) of the holder plate 50 to act as the center of rotation of the cup holder section 30, and comprises a hinge partition wall 71, a hinge shaft 73, and a stopper 75.

For example, the hinge partition wall 71 is composed of a left hinge partition wall 71a and a right hinge partition wall 71b protruding from the left and right lateral sides of the holder plate 50 to define, in the folding section 50A between the left/right hinge partition walls 71a and 71b, a cup holder space as a storage space in which the cup holder guide 31 and the cup support base 33 of the cup holder section 30 are accommodated.

As an example, the hinge shaft 73 comprises an upper hinge shaft 73a passing through the upper hinge rotary part of the cup holder guide 31 and a lower hinge shaft 73b passing through the lower hinge rotary part of the cup support base 33, wherein each of the upper/lower hinge shafts 73a and 73b is composed of an extended shaft, which is fitted into and supported by shaft through-holes 71c (see FIG. 8) of the left/right hinge partition walls 71a and 71b.

For example, the stopper 75 has a protrusion structure having a lower stopper portion 75a and an upper stopper portion 75b that protrude into the cup holder space defined in the folding section 50A of the holder plate 50. The lower stopper portion 75a serves to seat the cup holder guide 31 of the cup holder section 30, while the upper stopper portion 75b serves to press the cup holder guide 31 of the cup holder section 30 at a position above the lower stopper portion 75a. In this case, the lower stopper portion 75a has a bar-shaped linear protrusion structure that is positioned lower than the upper stopper portion 75b having an arc-shaped curved protrusion structure.

Figure 8:
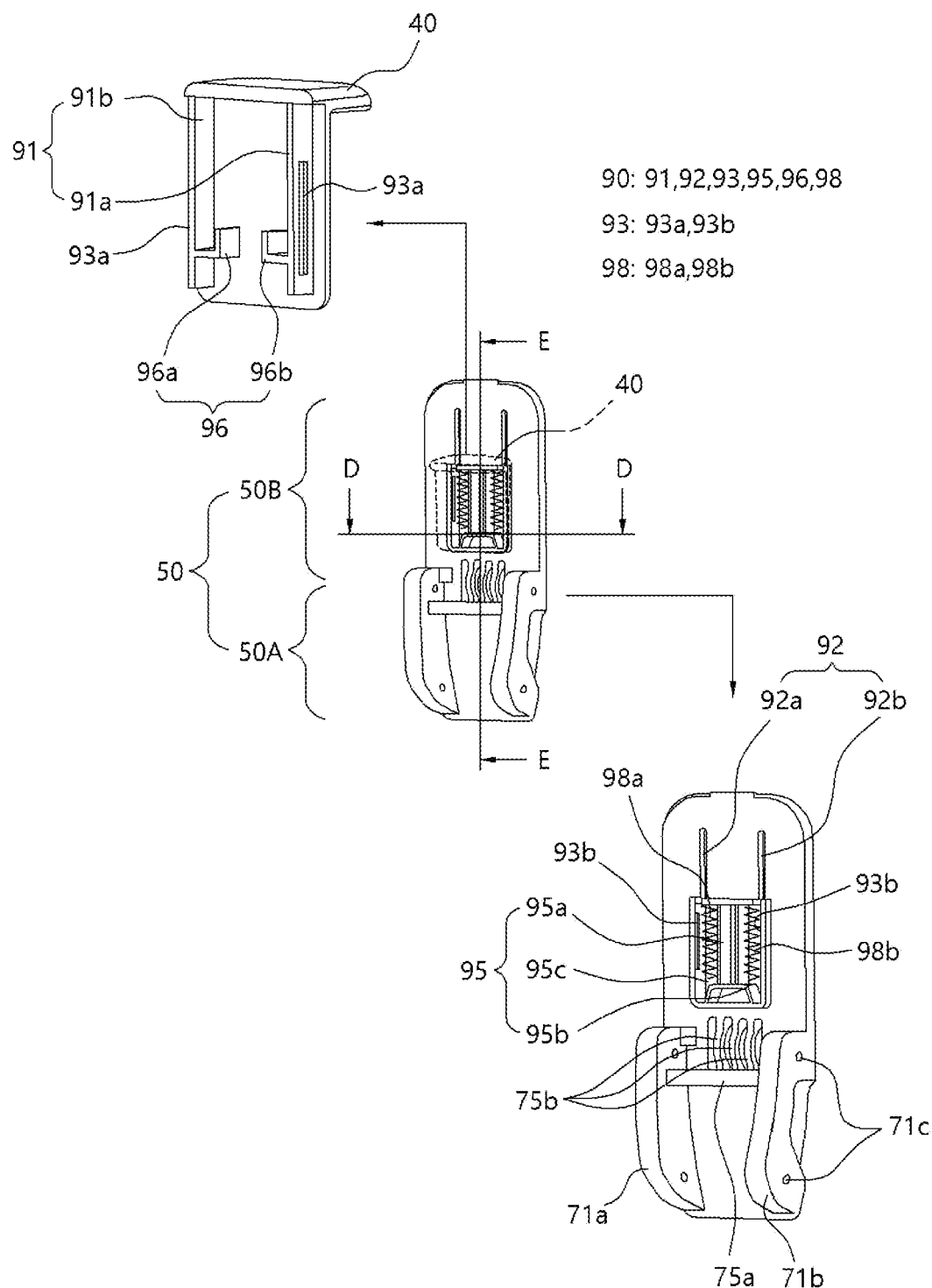
FIG. 8 is a detailed configuration diagram illustrating a sliding mechanism using a moving holder and a holder plate according to the present disclosure.

Referring to the cross section A-A of FIG. 3, the lower stopper portion 75a protrudes forward in a bar shape from the front surface of the holder plate 50 to connect the left/right hinge partition walls 71a and 71b so that the upper hinge rotary part of the cup holder guide 31 is seated on and supported by the lower stopper portion. In contrast, the upper stopper portion 75b protrudes forward in an arc shape from the front surface of the holder plate 50 so that the upper stopper portion is brought into contact with the concave contact surface 31*a* formed on the upper hinge rotary part of the cup holder guide 31. In this case, as illustrated in FIG. 8, a group of upper stopper portions 75*b* is formed in an arc-shaped protrusion structure.

Therefore, the lower stopper portion 75*a* provides a supporting force to prevent the unfolded (i.e., 90° unfolded) cup holder guide 31 from further pivoting down, and the upper stopper portion 75*b* provides a downward pressing force to the upper hinge rotary part of the cup holder guide 31 to restrain the upper hinge rotary part so that the cup holder guide 31 maintains its unfolded (i.e., 90° unfolded) state if an external force (i.e., a manipulating force) for switching to a folded state is not applied thereto.

Referring back to FIG. 2, the tilt mechanism 80 is provided on the cup holder guide 31 of the cup holder section 30, and comprises a first-stage protrusion 81 and a second-stage groove 83. In this case, the first-stage protrusion 81 and the second-stage groove 83 are formed on the upper surface of the cup holder guide 31.

For example, the first-stage protrusion 81 is formed in a protrusion structure on the upper surface of the cup holder guide 31 at a specified distance forward with respect to the upper hinge rotary part of the cup holder guide 31, and the second-stage groove 83 is formed in a recessed structure on the upper surface of the cup holder guide 31 at a position forward from the first-stage protrusion 81. In this case, the tilt mechanism 80 can adjust the screen-watching angle in three or more stages by forming two or more protrusion structures such as the first-stage protrusion 81.

Therefore, the tilt mechanism 80 can adjust the passenger's screen-watching angle in two stages by, on the basis of the first-stage protrusion 81, setting a rear position of the first-stage protrusion 81 to a first-stage oblique holding position for mobile devices and a front position of the first-stage protrusion to a second-stage oblique holding position for mobile devices.

Meanwhile, FIGS. 4 to 7 illustrate operations of the folding mechanism 70 and the tilt mechanism 80.

Figure 4:
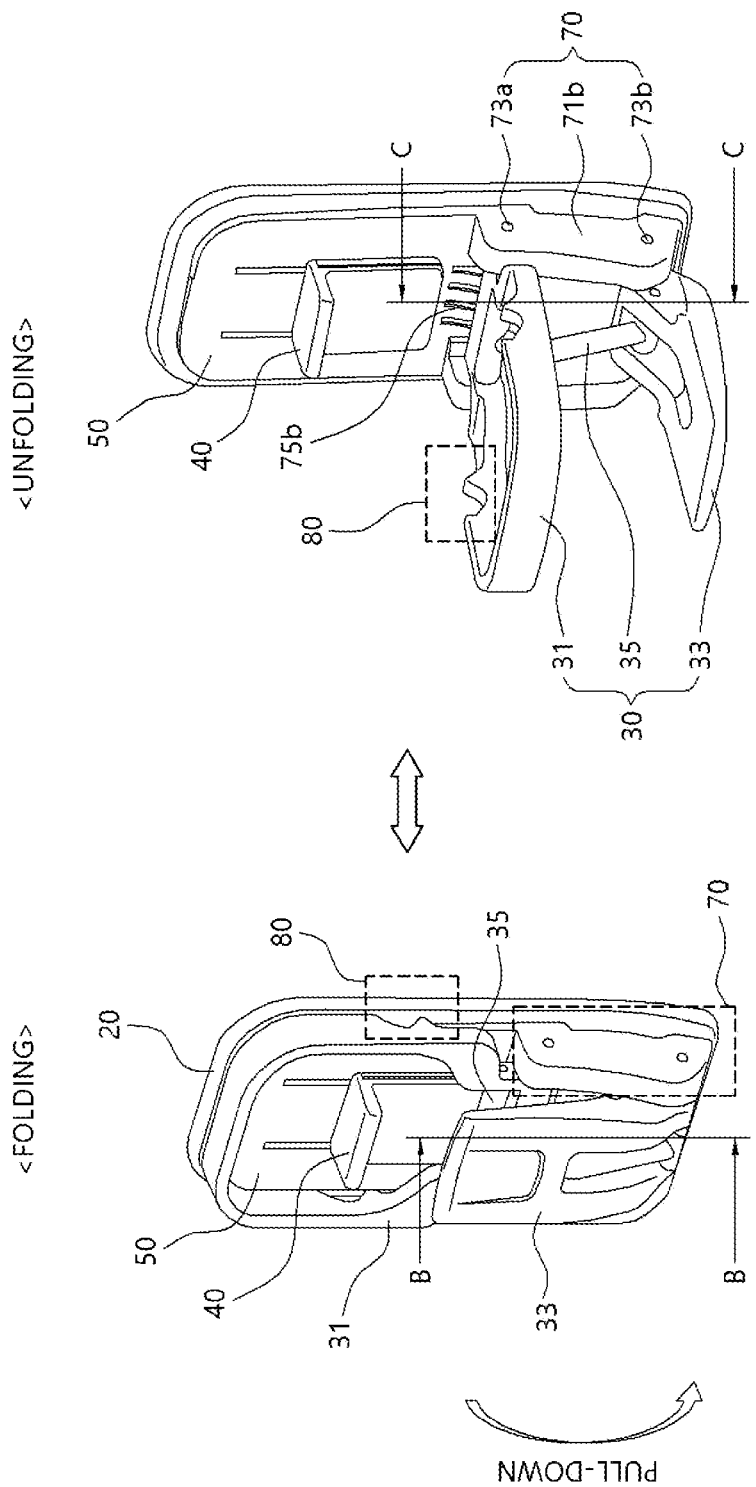
FIGS. 4 and 5 are views illustrating operation states of a cup holder using the folding mechanism and the tilt mechanism according to the present disclosure.

Referring to the folding mechanism 70 of FIG. 4, when the cup holder guide 31 of the cup holder 30 is pulled down from a folded state of being in close contact with the holder plate 50, the folding mechanism 70 allows for a rotating operation about the upper/lower hinge shafts 73*a* and 73*b* of the hinge shaft 73 as the center of rotation so that the cup holder guide 31 and the cup support base 33 are unfolded in a 90° deployed (i.e., unfolded) state.

Figure 5:
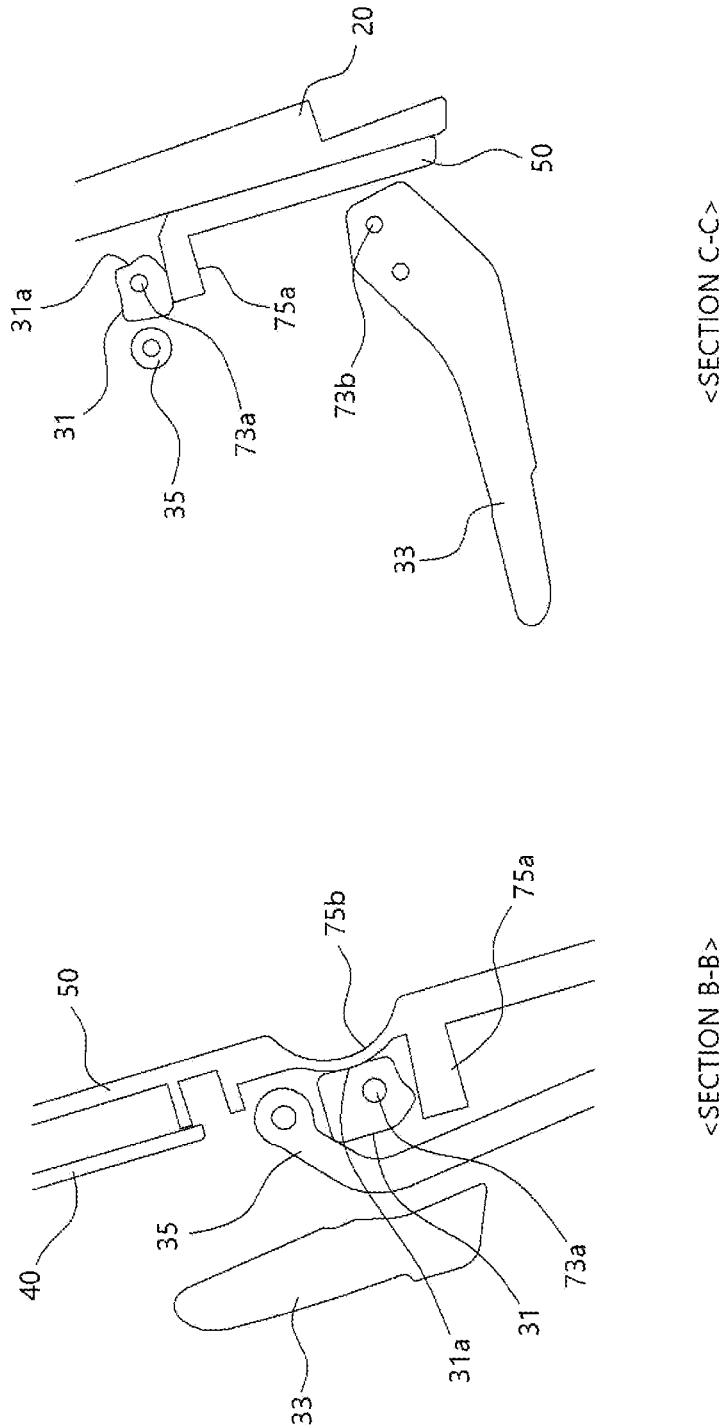

Referring to sections B-B and C-C of FIG. 5, the upper hinge shaft 73*a* acts as the center of rotation with respect to the upper hinge rotary part of the cup holder guide 31 in a state of being fixed to the upper side of the hinge partition wall 71 (i.e., the left/right hinge partition walls 71*a* and 71*b*). At the same time, the lower hinge shaft 73*b* acts as the center of rotation with respect to the upper hinge rotary part of the cup support base 33 in a state of being fixed to the lower side of the hinge partition wall 71 (i.e., the left/right hinge partition walls 71*a* and 71*b*).

In this way, while the cup holder section 30 switches from the folded state to the unfolded state, the link rod 35 of the cup holder section 30 acts as a medium that transmits the pull-down force of the cup holder guide 31 to the cup support base 33 so that the cup support base 33 is unfolded in a 90° deployed (i.e., unfolded) state about the link rod 35, together with the cup holder guide 31.

Figure 6:
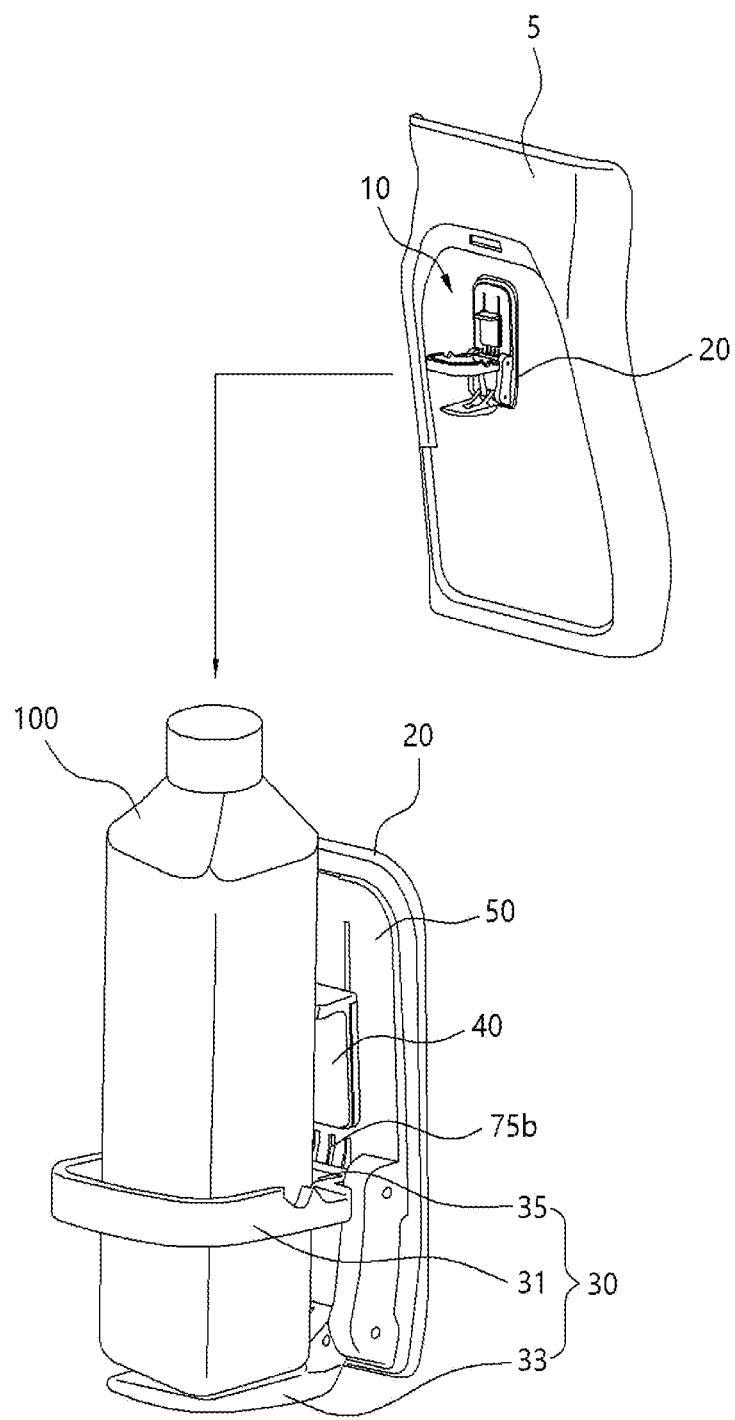
FIG. 6 is a view illustrating an example of holding a PET bottle, which is a portable container, after changing the use state with the folding mechanism of the cup holder according to the present disclosure.

Referring to the use state of the cup holder section 30 of FIG. 6 in which the cup holder section 30 is provided such that the cup holder guide 31 and the cup support base 33 are horizontally unfolded from the front surface of the holder plate 50, a PET bottle 100, which is a kind of portable container, is placed on the cup support base 33 in a state of being fitted into the cup holder guide 31.

In this holding state of the PET bottle 100, the cup holder section 30 firmly maintains the unfolded state of the cup holder guide 31 and the cup support base 33 with the connection structure of the link rod 35 to form a stable holding and affixing state of the PET bottle 100.

Figure 7:
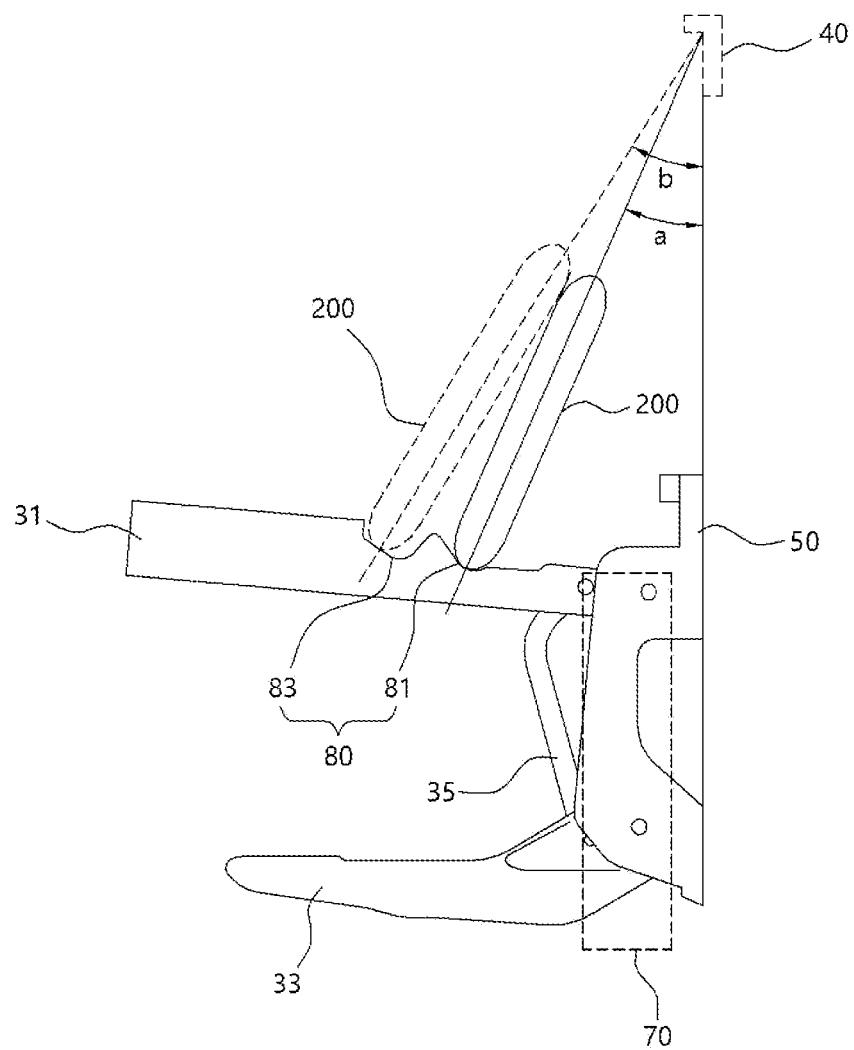
FIG. 7 is a view illustrating an example of adjusting the inclination angle of a smart phone with the tilt mechanism of the cup holder according to the present disclosure.

Referring to the use state of the tilt mechanism 80 of FIG. 7, the tilt mechanism 80 is formed in the cup holder section 30 (i.e., the cup holder guide 31) as a mobile device-cradle to hold a mobile device 200, 300, so that the tilt mechanism can adjust a passenger's screen-watching angle with respect to a smartphone 200 in at least two stages in a state in which the smartphone 200 placed on the mobile device-cradle is fixed with the moving holder section 40.

For example, the tilt mechanism 80 comprises a first-stage protrusion 81 that forms a front section of the mobile device-cradle on which the smartphone 200 is placed, and a second-stage groove 83 that forms a rear section of the mobile device-cradle on which the smartphone 200 is placed.

Therefore, the smartphone 200 can be provided with a watching angle of the first-stage inclination angle a using the first-stage protrusion 81 or a watching angle of the second-stage inclination angle b using the two-stage groove 83, thereby allowing a passenger to adjust the watching angle of the smartphone 200.

Specifically, in a state in which the cup holder guide 31 of the cup holder section 30 is in a 90° deployed (i.e., unfolded) state together with the cup support base 33, the tilt mechanism 80 may be used to take a first-stage inclined holding state for a smartphone 200 fixed with the first-stage protrusion 81 and the moving holder section 40 in the rear position, or a second-stage inclined holding state for a smartphone 200 fixed with the second-stage groove 83 and the moving holder section 40 in the front position with respect to the first-stage protrusion 81.

As described above, the tilt mechanism 80 is used to adjust the passenger's watching angle for a smartphone 200 in two stage by using the first-stage protrusion 81 and the second-stage groove 83. In this case, the first-stage inclination angle a is formed to be smaller than the second-stage inclination angle b when assuming that the holder plate 50 is taken as a vertical line.

On the other hand, FIGS. 8 and 9 illustrate a detailed configuration of a sliding mechanism 90 of the multifunctional member 60.

Referring to FIG. 8, the sliding mechanism 90 is provided in a sliding section 50B of the holder plate 50, and comprises a lifting guide 91, 92, 93 that implements a vertical movement path of the moving holder section 40, and a lowering guide 95, 96, 98 that provide a position-restoring force to the moving holder section 40.

That is, the sliding mechanism 90 is formed by a combination of the moving holder section 40 and the holder plate 50, in which the moving holder section 40 is moved on the holder plate 50 so that upper/lower strokes of the moving holder section 40 are formed and a height-adjustable distance H (see FIG. 10) is obtained with the upper/lower strokes.

Specifically, the lifting guide 91, 92, 93 forms an upward movement path of the moving holder section 40 in the holder plate 50 as an upper stroke, and comprises a sliding rail 91, a sliding slot 92, and a hook 93.

For example, the sliding rail 91 has a structure protruding from the rear surface of the moving holder section 40, the sliding slot 92 has a straight slot structure formed in the front surface of the holder plate 50, and the hook 93 is composed of a protruding structure of the moving holder section 40 and a groove structure of the holder plate 50. In this case, the front surface of the moving holder section 40 indicates the externally exposed direction, and the rear surface thereof indicates the direction in which the moving holder section is coupled to the holder plate 50, and the front surface of the holder plate 50 indicates the direction in which the cup holder section 30 and the moving holder section 40 are provided, and the rear surface thereof indicates the direction in which the holder plate is coupled to the mounting plate 20.

In particular, the sliding rail 91 is composed of a left protruding sliding rail 91a and a right protruding sliding rail 91b that are spaced a distance from each other, and the sliding slot 92 is composed of a left recessed sliding slot 92a and a right recessed sliding slot 92b that are spaced a distance from each other. In this case, each of the left/right protruding sliding rails 91a and 91b and the left/right recessed sliding slots 92a and 92b is formed in a straight section whose length is the upper or lower movement stroke (i.e., the upper/lower stroke) of the sliding mechanism 90 or a height-adjustable length of the moving holder section 40.

Therefore, the left sliding rail 91a is engaged with the left sliding slot 92a, the right sliding rail 91b is engaged with the right sliding slot 92b, and the left/right sliding rails 91a and 91b are moved in a vertical direction using the left/right sliding slots 92a and 92b as movement paths. In this case, the left/right sliding rails 91a and 91b are located in an inner space of a casing 95 of the lowering guide 95, 96, 98 and exit toward the left/right sliding slots 92a and 92b, and left/right sliding slot 92a, 92b are located on the outside of the casing 95 of the lowering guide 95, 96, 98.

In addition, the hook 93 is coupled in a concave-convex fitting structure between the side of the sliding rail 91 (i.e., the left/right sliding rails 91a and 91b) of the lifting guide 91, 92, 93 and a casing 95 inner wall (i.e., left/right inner walls) of the lowering guide 95, 96, 98 so as to restrict upward movement of the sliding rail 91 (i.e., the left/right sliding rails 91a and 91b) fitted into the sliding slot 92 (i.e., the left/right sliding slots 92a and 92b).

To this end, the hook 93 is composed of a positioner 93a and a positioning groove 93b, wherein the positioner 93a protrudes in the longitudinal direction from the outside of the left sliding rail 91a and the outside of the right sliding rail 91b, and the positioning groove 93b is recessed in the longitudinal direction in the left/right inner wall of the casing 95 forming the lowering guide 95, 96, 98.

Therefore, in the hook 93, the positioner 93a is inserted into the positioning groove 93b to provide a restricting force so as to prevent the moving holder section 40 from being detached or decoupled from the holder plate 50 during upward/downward movement of the sliding rail 91 (i.e., the left/right sliding rails 91a, 91b) along the sliding slot 92 (i.e., the left/right sliding slots 92a and 92b), Specifically, the lowering guide 95, 96, 98 provides a compressive force accumulated during the upper stroke of the lifting guide 91, 92, 93 as a restoring force for returning the moving holder section 40 to its initial position in the lower stroke process, and comprises a casing 95, a base portion 96, and a compressive spring 98.

For example, the casing 95 protrudes from the front surface of the holder plate 50 in a quadrangular frame shape to form a lower section of the sliding rail 91, thereby accommodating all of the sliding rail 91, the sliding slot 92, the hook 93, the base portion 96, and the compressive spring 98 in the quadrangular frame space.

To this end, the casing 95 has a partition wall 95c that divides the rectangular frame space into left and right spaces, wherein the left space defined by the partition wall 95c is formed as a left chamber 95a in which the left sliding rail 91a, the left sliding slot 92a, and the left base portion 96a, and the left compressive spring 98a are accommodated, and the right space defined by the partition wall 95c is formed as a right chamber 95b in which the right sliding rail 91b, the right sliding slot 92b, the right base portion 96b, and the right compressive spring 98b are accommodated.

For example, the base portion 96 is composed of a pair of left/right base portions 96a and 96b protruding respectively from the left sliding rail 91a and the right sliding rail 91b in a mutually facing direction. In this case, the left base portion 96a protrudes from one side of the left sliding rail 91a toward the space between the left/right sliding rails 91a and 91b, and the right base portion 96b protrudes from the side surface of the right sliding rail 91b toward the space between the left/right sliding rails 91a and 91b.

In particular, since the left base portion 96a in a " ⌋ " shape and the right base portion 96b in a " ⌊ " shape faces each other, the pair of left/right base portions 96a and 96b are configured in a " ⌊ ⌋ " shape in the space between the left/right sliding rails 91a and 91b. In this case, the " ⌋ " shape of the left base portion 96a is located in the lower section of the left sliding rail 91a, and the " ⌊ " shape of the right base portion 96b is located in the lower section of the right sliding rail 91b.

For example, the compressive spring 98 consists of a pair of left/right compressive springs 98a and 98b, which is disposed in the quadrangular frame inner space of the casing 95 in a double spring arrangement structure. Here, the left/right compressive springs 98a and 98b are made in the shape of a coil spring.

In particular, the left compressive spring 98a is accommodated in the left chamber 95a of the casing 95 so as to be elastically supported by the " ⌋ " shaped left base portion 96a, and the right compressive spring 98b is accommodated in the right chamber 95b of the casing 95 so as to be elastically supported by the " ⌊ " shaped right base portion 96b.

Therefore, the left/right compressive springs 98a and 98b are respectively compressed in the left/right chambers 95a and 95b by the left/right left base portions 96a and 96b that move upward together with the moving holder section 40, thereby fixedly holding a smartphone 200 or a mobile device 300 (see FIGS. 5 and 9) in a state of the moving holder section 40 being moved upward.

Referring to the section D-D of FIG. 9, the positioner 93a of the hook 93 forms a triangular protrusion protruding from one side (that is, in a direction facing the positioning groove 93b), thereby preventing detachment or decoupling from the positioning groove due to the contact between the inner wall of the space of the positioning groove 93b and the triangular protrusion. In this case, the positioner 93a forms the triangular protrusion at a position having a fitting gap with the rear surface of the moving holder section 40, and in the fitting gap, the end portion of a quadrangular frame of the casing 95 is fitted in a frame step K.

Referring further to the sections D-D and E-E of FIG. 9, the casing 95 forms a quadrangular frame step K, which supports the bottom of an upper step of the rear surface of the upper cover part in the "T" shape of the moving holder section 40, thereby preventing the downward movement of the moving holder section 40 while increasing the depth of the chamber space of the casing 95 so that an elastic restoring force may be set differently through a variation in spring diameter of the compressive spring 98.

Figure 10:
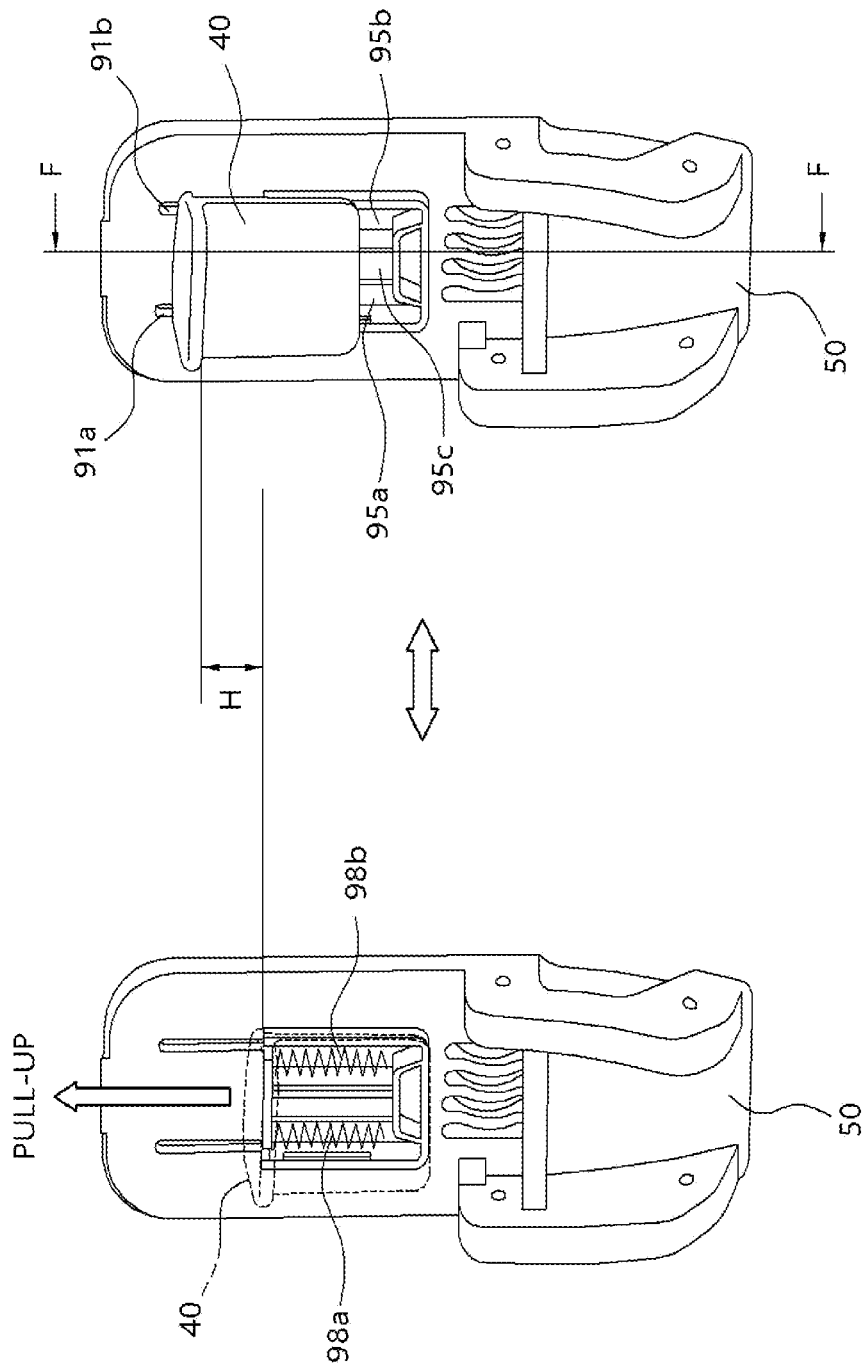
FIGS. 10 and 11 are views illustrating the height-adjusted states of the sliding mechanism according to the present disclosure.
Figure 11:
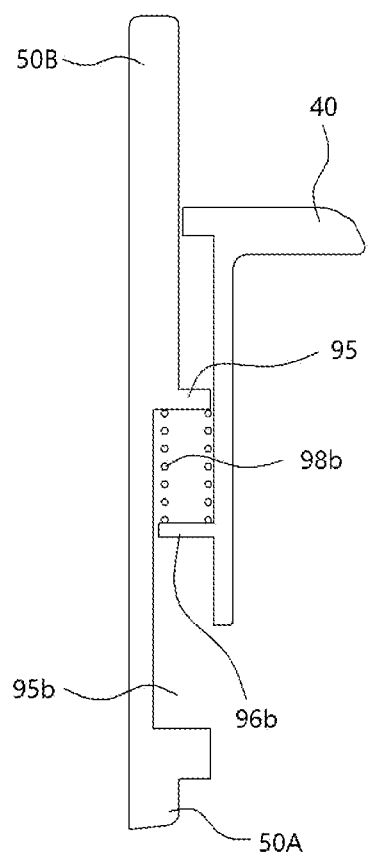
Figure 12:
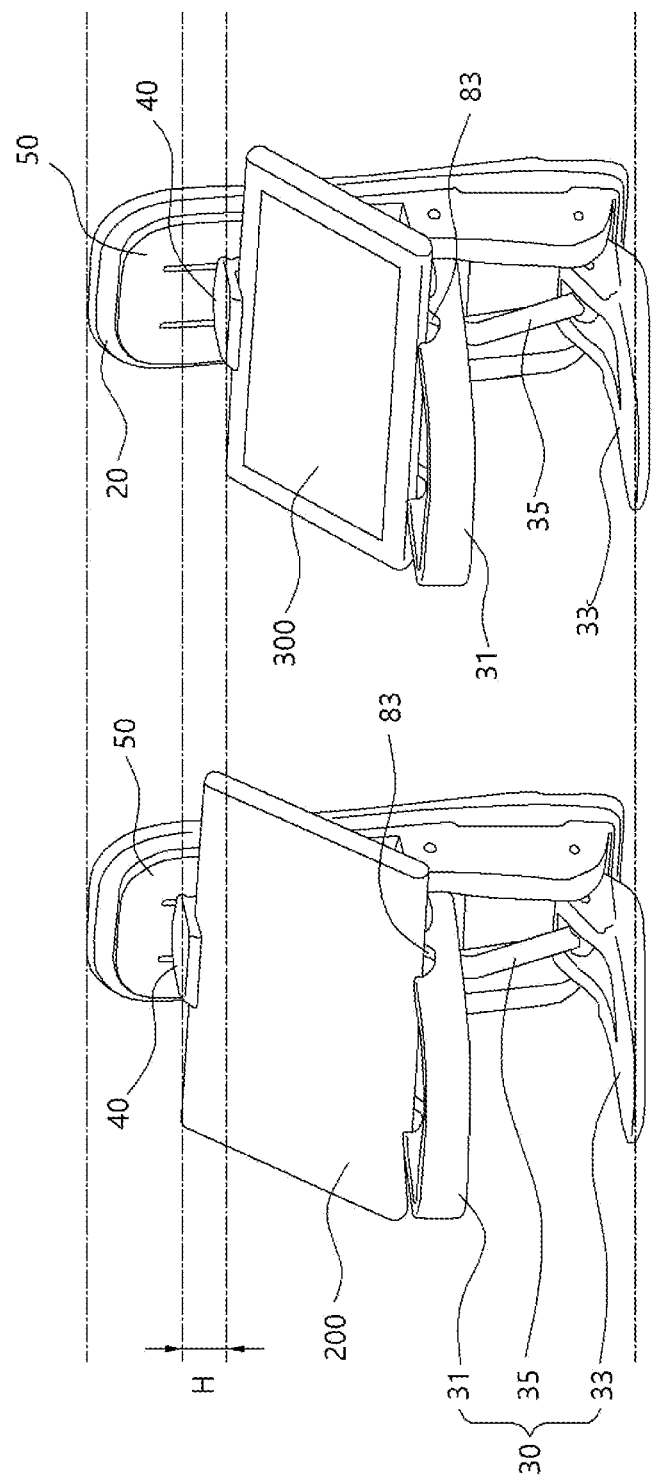
FIG. 12 is a view illustrating an example in which smart phones and mobile devices of different width sizes are mounted and fixed by using the height adjustment of the sliding mechanism according to the present disclosure.

On the other hand, FIGS. 10 to 12 illustrate the operation of the sliding mechanism 90.

Referring to the sliding mechanism 90 of FIG. 10, the sliding mechanism 90 has a height-adjustable distance H for the upward movement of the moving holder section 40.

For example, when the moving holder section 40 is raised upward, the sliding rail 91 (that is, the left/right sliding rails 91*a* and 91*b*) formed in the moving holder section 40 is moved upward along the sliding slot 92 (that is, the left/right sliding slots 92*a* and 92*b*) of the holder plate 50, and the moving holder section 40 is moved upward to a maximum rising position at the height-adjustable distance H. In this case, the sliding slot 92 (i.e., the left/right sliding slots 92*a* and 92*b*) is formed to have a length longer than the height adjustable distance H.

Referring to the cross-section F-F of FIG. 11, the base portion 96 (i.e., the left/right base portions 96*a* and 96*b*) ascending together with the sliding rail 91 (i.e., the left/right sliding rails 91*a* and 91*b*) compresses the compressive spring 98 (that is, the left/right compressive springs 98*a* and 98*b*), so that the compressive spring 98 (i.e., the left/right compressive springs 98*a* and 98*b*) is compressed by the height-adjustable distance H.

Accordingly, the smartphone 200 or the mobile device 300 (see FIGS. 7 and 12) held by the first-stage protrusion 81 or the second-stage groove 83 of the tilt mechanism 80 (see FIG. 7) is fixedly held by a front upper step of the "T" shape of the moving holder section 40, which forms the front side of the upper cover part of the "T" shape, at the height-adjustable distance H that is obtained by the compressive deformation of the compressive spring 98 (i.e., the left/right compressive springs 98*a* and 98*b*).

In this state, the moving holder section 40 is fixedly positioned at the height-adjustable distance H by the smartphone 200 or the mobile device 300, so that the compressive spring 98 (i.e., the left/right compressive springs 98*a* and 98*b*) maintains the compressively deformed state.

Therefore, when the smartphone 200 or the mobile device 300 (refer to FIGS. 7 and 12) is removed from the moving holder section 40, the moving holder section 40 returns to its initial position with a downward elastic restoring force applied by the compressive spring 98 (i.e., the left/right compressive springs 98*a* and 98*b*).

Referring to the sliding mechanism 90 of FIG. 12, it can be seen that after the smartphone 200 and the mobile device 300 having different sizes are held by the tilt mechanism 80 in a 90° deployed state of the cup holder section 30 by the folding mechanism 70, the raised positions of the moving holder section 40 is appropriately fixed in response to their sizes within the height-adjustable distance H by the sliding mechanism 90.

As described above, the multifunctional portable article holder 10 applied to the vehicle 1 according to the present disclosure comprises the multifunctional member 10-1, which is composed of one or more of the folding mechanism 70 for folding or unfolding the cup holder section 30, in which the portable container 100 is fixedly placed, with respect to the holder plate 50, the tilt mechanism 80 for moving the position of the mobile devices 200, 300 held by the cup holder section 300 to change the watching angle for the mobile devices 200, 300, and the sliding mechanism 90 for moving the moving holder section 40 within the height-adjustable distance H to allow the 90° deployed cup holder section to be converted into a holder section for mobile devices, thereby affixing and holding various portable articles with different shapes, such as cups and smartphones while maintaining an advantageous foldable feature of the cup holder capable of reducing the overall volume, and in particular, adjusting a passenger's screen-watching angle in multiple stages with the tilt-type structure, while easily holding mobile devices having different sizes with the foldable structure associated sliding-type structure.

What is claimed is:

1. A multifunctional portable article holder comprising:
a cup holder section configured to hold a portable container;
a moving holder section configured to affix a mobile device placed on and held by the cup holder section;
a holder plate coupling the cup holder section and the moving holder section; and
a folding mechanism configured to fold or unfold the cup holder section with respect to the holder plate;
wherein the folding mechanism comprises:
a hinge partition wall formed on the holder plate and protruding from the holder plate to delimit a cup holder section space in which the cup holder section is positioned;
a hinge shaft supported by the hinge partition wall as a center of rotation for a hinge rotary part of the cup holder section to fold or unfold the cup holder section; and
a stopper structure formed on the holder plate and protruding from the holder plate so as to be in contact with the cup holder section so that an unfolded state of the cup holder section is constrained; and
wherein the stopper structure comprises:
a front stopper that supports the hinge rotary part to prevent downward movement of the cup holder section in the unfolded state of the cup holder section; and
a rear stopper that presses the hinge rotary part to prevent upward movement of the cup holder section in the unfolded state of the cup holder section.

2. The multifunctional portable article holder of claim 1, wherein the cup holder section is provided at a lower folding section of the holder plate, and
wherein the moving holder section is provided at an upper sliding section of the holder plate.

3. The multifunctional portable article holder of claim 1, wherein the cup holder section comprises:
a cup holder guide configured to support a body portion of the portable container;
a cup support base configured to support a bottom surface of the portable container; and
a link rod configured to fixedly connect the cup holder guide and the cup support base with a gap interposed therebetween to allow the cup holder guide and the cup support base to be folded or unfolded at the same time.

4. The multifunctional portable article holder of claim 3, wherein the cup holder guide and the cup support base are capable of switching between a folded state having a vertical (0°) position and an unfolded state having a horizontal (90°) position.

5. The multifunctional portable article holder of claim 1, wherein the moving holder section comprises an upper holding part configured to hold the mobile device.

6. The multifunctional portable article holder of claim 1, wherein the front stopper has a bar-shaped protrusion structure.

7. The multifunctional portable article holder of claim 1, wherein the rear stopper has an arc-shaped curved protrusion structure.

8. The multifunctional portable article holder of claim 1, further comprising a tilt mechanism formed in the cup holder section and configured to position the mobile device on the cup holder section at different watching angles.

9. The multifunctional portable article holder of claim 8, wherein the tilt mechanism comprises:
   a first-stage protrusion forming a front section on a mobile device holder; and
   a second-stage groove forming a rear section on the mobile device holder.

10. The multifunctional portable article holder of claim 1, further comprising a sliding mechanism configured to move the moving holder section within a height-adjustable distance;
   wherein the sliding mechanism is formed by a combination of the moving holder section and the holder plate to provide the height-adjustable distance as an upper/lower stroke of the moving holder section.

11. The multifunctional portable article holder of claim 10, wherein the sliding mechanism comprises:
   a lifting guide forming a movement path of the moving holder section in the holder plate; and
   a lowering guide for returning the moving holder section to an initial position.

12. The multifunctional portable article holder of claim 11, wherein the lifting guide comprises:
   a sliding rail in the form of a protrusion structure on the moving holder section;
   a sliding slot recessed in the form of a slot structure in the holder plate; and
   a hook coupled in the form of a concave-convex (凹凸) fitting structure between a side surface of the sliding rail and an inner wall of a casing of the lowering guide to prevent an upward movement of the sliding rail.

13. The multifunctional portable article holder of claim 12, wherein the fitting structure is composed of a convex-shaped (凸) positioner protruding from the side surface of the sliding rail and a concave-shaped (凹) positioning groove recessed in the inner wall of the casing.

14. The multifunctional portable article holder of claim 11, wherein the lowering guide comprises:
   a casing in the form of a quadrangular frame structure on the holder plate and covered by the moving holder section;
   a left base portion and a right base portion each in the form of a protrusion structure on the moving holder section and positioned in an inner space of a quadrangular frame of the casing; and
   a left compressive spring and a right compressive spring each elastically supported by a respective one of the left base portion and the right base portion.

15. The multifunctional portable article holder of claim 14, wherein:
   the left compressive spring is provided in a left chamber of the inner space of the quadrangular frame of the casing;
   the right compressive spring is provided in a right chamber of the inner space of the quadrangular frame of the casing; and
   the left and right chambers are formed by dividing the inner space of the quadrangular frame of the casing with a partition wall of the casing.

16. The multifunctional portable article holder of claim 1, wherein the holder plate is mounted on a seat back of a seat via a mounting plate so that the cup holder section and the moving holder section are configured to be manipulated from a rear side of the seat back, and wherein the mounting plate has a rectangular plate shape and is attached to the seat back by screws or welding.

17. A multifunctional portable article holder comprising:
   a cup holder section configured to hold a portable container;
   a moving holder section configured to affix a mobile device placed on and held by the cup holder section;
   a holder plate coupling the cup holder section and the moving holder section;
   a folding mechanism configured to fold or unfold the cup holder section with respect to the holder plate; and
   a sliding mechanism formed by a combination of the moving holder section and the holder plate to provide a height-adjustable distance as an upper/lower stroke of the moving holder section;
   wherein the sliding mechanism comprises:
      a lifting guide forming a movement path of the moving holder section in the holder plate; and
      a lowering guide for returning the moving holder section to an initial position; and
   wherein the lifting guide comprises:
      a sliding rail in the form of a protrusion structure on the moving holder section;
      a sliding slot recessed in the form of a slot structure in the holder plate; and
      a hook coupled in the form of a concave-convex (凹凸) fitting structure between a side surface of the sliding rail and an inner wall of a casing of the lowering guide to prevent an upward movement of the sliding rail.

\* \* \* \* \*